US008127623B2

United States Patent
Son et al.

(10) Patent No.: US 8,127,623 B2
(45) Date of Patent: Mar. 6, 2012

(54) CAPACITIVE TACTILE TILE SENSOR (75) Inventors: Jae S. Son, Rancho Palos Verdes, CA (US); Yerko Alfonso, Covina, CA (US)

(73) Assignee: Pressure Profile Systems Inc., Los Angeles, CA (US)

( * ) Notice: Subject to any disclaimer, the term of this patent is extended or adjusted under 35 U.S.C. 154(b) by 715 days.

(21) Appl. No.: 12/246,293

(22) Filed: Oct. 6, 2008

(65) Prior Publication Data

US 2009/0033341 A1 Feb. 5, 2009

Related U.S. Application Data (63) Continuation-in-part of application No. 11/131,501, filed on May 18, 2005, now Pat. No. 7,430,925, and a continuation-in-part of application No. 11/407,535, filed on Apr. 20, 2006, now Pat. No. 7,609,178.

(51) Int. Cl.
*G01L 1/04* (2006.01)
*H03M 11/00* (2006.01)

(52) U.S. Cl. .................. 73/862.046; 341/33; 178/18.06

(58) Field of Classification Search .................. 341/33; 178/18.06; 345/173; 73/862.046
See application file for complete search history.

(56) References Cited

U.S. PATENT DOCUMENTS

| | | | |
|---|---|---|---|
| 4,873,400 A * | 10/1989 | Rapp et al. | 178/18.05 |
| 5,237,879 A | 8/1993 | Speeter | |
| 5,760,530 A | 6/1998 | Kolesar | |
| 5,787,681 A | 8/1998 | Papina | |
| 5,920,309 A * | 7/1999 | Bisset et al. | 345/173 |
| 5,965,880 A | 10/1999 | Wolf | |
| 6,002,389 A * | 12/1999 | Kasser | 345/173 |
| 6,888,537 B2 | 5/2005 | Benson | |
| 6,995,744 B1 | 2/2006 | Moore | |
| 7,357,035 B2 | 4/2008 | Liu | |
| 7,375,535 B1 | 5/2008 | Kutz | |
| 7,394,458 B2 * | 7/2008 | Lyon et al. | 345/173 |
| 7,430,925 B2 | 10/2008 | Son | |
| RE40,867 E * | 8/2009 | Binstead | 341/33 |
| 2006/0274055 A1 * | 12/2006 | Reynolds et al. | 345/174 |
| 2007/0257821 A1 | 11/2007 | Son | |
| 2008/0065225 A1 | 3/2008 | Wasielewski | |
| 2009/0040191 A1 * | 2/2009 | Tong et al. | 345/174 |

\* cited by examiner

*Primary Examiner* — Lisa Caputo
*Assistant Examiner* — Punam Roy
(74) *Attorney, Agent, or Firm* — Boris Lechinsky (57) ABSTRACT

A capacitive tile tactile sensor is described and includes several groups of individual sensors each controlled by a dedicated IC. Individual sensors are formed by sensing electrodes on one side of the sensor and a single ground electrode on the other side, the ground electrode is separated from the sensing electrodes by a compressible dielectric layer. A single electrical connection between the ground electrode and the sensing electrode layer allows for routing of all electrical connections including individual electrodes and a ground electrode to appropriate ICs within the same layer using conductive ink or other similar techniques. Stand-alone configurations are described as well as those adapted for communicating with outside control means including a personal computer. Arranging groups of sensors in parallel with each other creates a matrix of sensors while arranging them along a single line creates a linear strip sensor. Using off-the-shelf capacitance-sensing ICs to control a limited number of capacitance sensors allows reducing the number of electrical connections to the sensor array and increasing its reliability.

16 Claims, 10 Drawing Sheets

CAPACITIVE TACTILE TILE SENSOR

CROSS-REFERENCE DATA

This application is a continuation-in-part of a U.S. patent application Ser. No. 11/131,501 entitled "Hybrid Tactile Sensor" filed May 18, 2005, now U.S. Pat. No. 7,430,925. It is also a continuation-in-part of a U.S. patent application Ser. No. 11/407,535 entitled "Reconfigurable Tactile Sensor Input Device" filed Apr. 20, 2006 now U.S. Pat. No. 7,609,178, both documents incorporated herein in their entirety by reference.

BACKGROUND OF THE INVENTION

The present invention relates generally to a field of sensors, and, more particularly, to designs and methods of assembly of tactile array sensors used for sensing pressure distribution. Specifically, the present invention describes the use of multiple capacitance-sensing integrated circuits (ICs) each controlling a limited number of individual capacitor sensors, these individual sensors together forming the entire tactile array. This arrangement allows for convenient and repeatable manufacturing of tactile array sensors, especially those with high number of closely located individual sensors.

Tactile sensing involves a continuous measuring of variable tactile force or pressure. In some respects, tactile sensing for electromechanical devices is analogous to the human sense of touch in that information about the amount and distribution of tactile pressure over a surface can be received and transmitted. Not surprisingly, tactile sensing finds great utility in the field of robotics where such tactile sensors provide signals for negative feedback control of servomechanisms and the like. Tactile sensing can provide information about shape, texture, position, orientation, deformation, center of mass, and presence of torque or slippage with respect to an object in contact with the sensor. Other applications of tactile sensing will come to mind to those skilled in the art.

The tactile sensor or tactile sensing transducers can be configured with an array of electrodes to provide a measure of the distribution of tactile pressure over a surface. Ideally, the tactile sensor will have sufficient sensitivity, consistent reproducibility, and high resolution.

One of the known methods employed in tactile sensing is the use of a medium whose electrical properties vary in response to pressure induced deformation. For example, some materials exhibit a piezoresistive effect, i.e. the electrical resistance of the material varies in response to its deformation. Layers of such material sandwiched between two conductive plates will provide a means for detecting pressure when an electrical potential is established between the two plates. The current flowing between them will therefore vary according to the deformation of the intermediate layer resulting from an external pressure forcing the plates closer together. The current will change according to Ohm's Law, such that measuring the current can provide a means for measuring the tactile force applied to the plates. Compression-sensitive materials currently in use include for example foamed polymers, which contain conductive fillers such as finely divided particles of metal or carbon. Polyurethane and silicone are also commonly used.

There are also known two-dimensional capacitive pressure sensors developed primarily for realizing in the so-called "touch pads" of portable PCs that allow the reconstruction of the position of an object weighing onto the surface of the sensor. U.S. Pat. No. 5,374,787 describes a sensor of the position of such an object onto a sensible surface. These devices are realized with manufacturing techniques of printed circuit boards (PCB), according to which a substrate of fiberglass or of Mylar® is provided with copper orthogonal stripes defined on one or on the other face of the substrate. Notwithstanding that a substrate of Mylar® or of another dielectric material may be moderately flexible, at least for small deflections, the sensor so constructed remains substantially rigid and not pliable into different geometric shapes. It is evident that these known devices are unsuitable for covering multi-curvature shapes such as a robot fingertip, other organic shapes, or to be incorporated in any object that must retain flexibility and pliability to conform to different shapes as a fabric.

Figure 1:
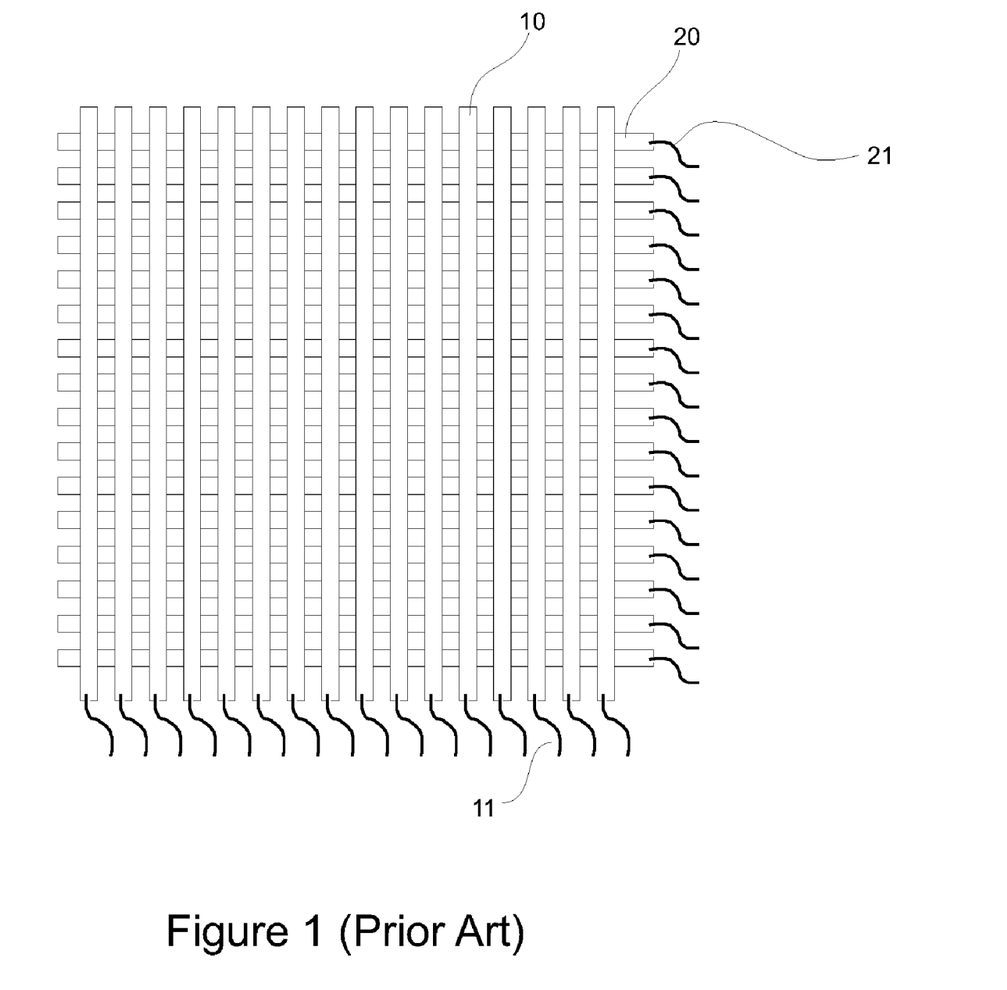
FIG. 1 is an illustration showing a typical prior art tactile sensor array formed between two layers of parallel electrodes.

FIG. 1 illustrates the principle of creating a typical conductive cloth-based tactile sensor array. Such device generally consists of a top plurality of parallel electrodes 10 that are placed over the bottom plurality of electrodes 20 with a non-conductive elastic isolation layer therebetween. Both the top 10 and bottom 20 pluralities of electrodes can be made of a conductive cloth-based material such as LYCRA™ that can be stretched in one or both X and Y directions. Other materials such as conductive weave fabrics can also be used for this purpose. Individual electrodes can be made as metallized fibers, strands, or yarns that form such conductive cloth or in any other way that is known from the prior art. If soldering is to be used to connect electrodes to the wires of the control unit, the temperature stability of the fabric material should be chosen to allow soldering to take place. In a typical configuration shown on FIG. 1, top electrodes are positioned to be perpendicular to the bottom electrodes forming the intersection areas, which define individual pressure sensors.

The non-conductive material separating the two layers with electrodes is typically chosen to be elastic and compress under the force applied to it within the range of forces estimated to be the working range for each tactile sensor array. For each of the intersection areas in which the top electrode intersects the bottom electrode, a capacitor is therefore formed between the top electrode and the bottom electrode with a compressible non-conductive material therebetween. That capacitor is used as an individual pressure sensor. As the pressure of force is applied to each such sensor, the top electrode is moved closer to the bottom electrode with the compression of the non-conductive material separating the two electrodes. Voltage potential is applied to both the top electrode and the bottom electrode so the capacitance can be measured therebetween. Changing capacitance reflects the degree of pressure or force applied to each sensor in the array. Typically, one plurality of electrodes is designated as a Drive Strip and the other plurality is designated as a Sense Strip. Drive electronics can provide selective measuring of capacitance at any chosen point between these strips of electrical conductors. High speed scanning of all the points in the matrix results in a single data frame reflecting pressure distribution over the surface of the matrix.

FIG. 1 further illustrates a typical way to connect individual electrodes to the outside control unit using connections 11 and 21 for the first plurality of electrodes 10 and the second plurality 20 respectively. The total number of such connections is defined by the number of electrodes in the first plurality plus the number of electrodes in the second plurality. For large tactile arrays having closely positioned electrodes, reliable and consistent manufacturing of such connections presents a technological challenge.

Flexible tactile sensor arrays can provide useful information about pressure distribution along curved surfaces. Despite the great extent of knowledge developed in the prior art, practical use of tactile conductive cloth-based sensor arrays has been limited until the present time. This is caused by the difficulties in manufacturing the tactile sensor array with more than just a few electrodes. Once the number of electrodes exceeds about 8 on each side of the array (the total of 16), direct attachment of the control unit wires to cloth-based electrodes becomes a burdensome procedure. One great difficulty is managing the large number of wires on both sides of the tactile sensor array and connecting them repeatedly in a reliable manner without intermittent opens and shorts between wires or electrodes.

Another manufacturing difficulty associated with the prior art tactile sensors stems from the high pitch density sensor designs having electrodes located closely together, typically less than only about 3 mm apart. Attaching individual wires to such electrodes becomes difficult as conductive epoxy or solder exhibits a tendency during assembly to deploy over more than one interconnection pad and therefore short the electrical connections.

Figure 2:
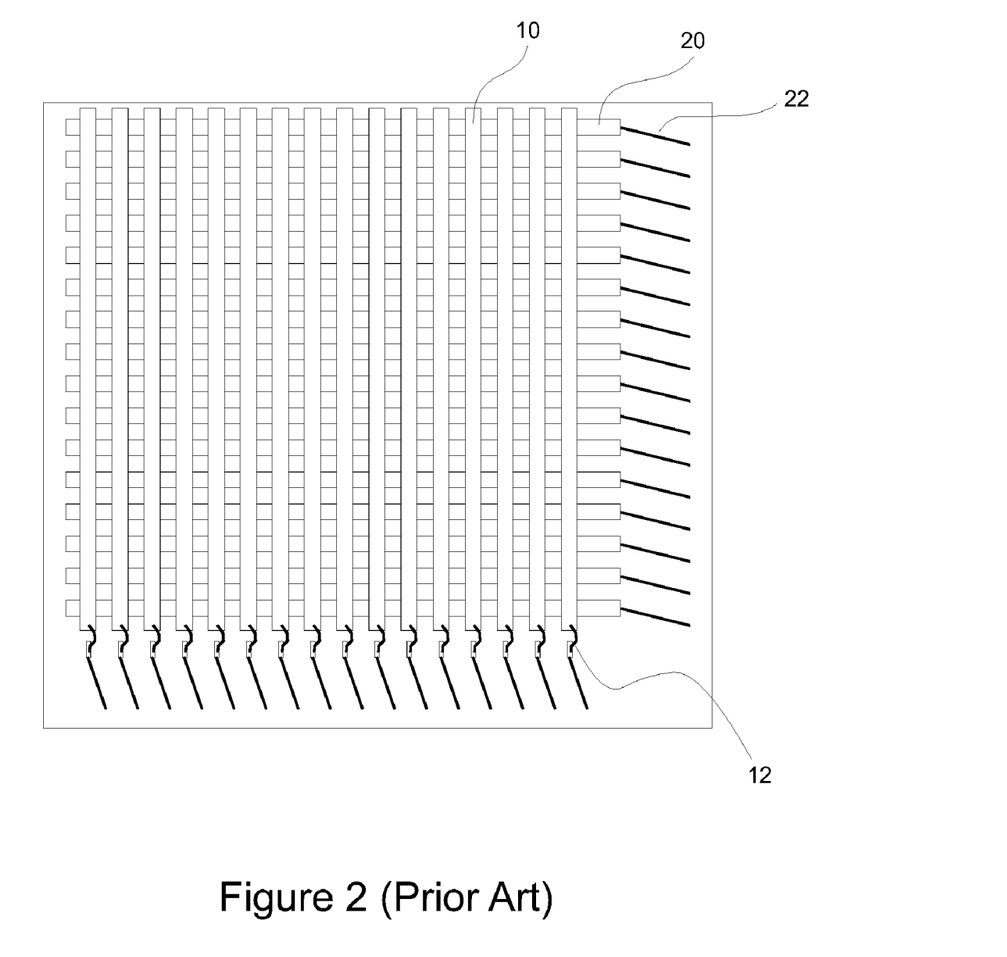
FIG. 2 is an illustration of the alternate connections for a typical tactile sensor array of the prior art.

Our U.S. Pat. No. 7,430,925 (See FIG. 2) discloses one useful method of reducing the number of attachments and producing them reliably, namely by using jumper wires 12 or using a flex harness with electrodes 22 etched therein or printed with the conductive ink.

Recent advances in design and broad availability of capacitive-sensing IC that can measure 12 to 24 individual sensor elements with a single chip is known to be useful for applications such as mobile phones where only a limited number of sensing elements are required.

The present invention contains further improvements in the structure of the tactile sensor arrays and provides for designs aimed at easier and more reliable manufacturing of such sensors.

SUMMARY OF THE INVENTION

Accordingly, it is an object of the present invention to overcome these and other drawbacks of the prior art by providing a novel capacitive tile tactile sensor designed to take advantage of the modern integrated circuits (IC). The novel tactile sensor is specifically adapted for ease and repeatability of high volume manufacturing.

It is another object of the present invention to provide a novel capacitive tile tactile sensor that can be consistently manufactured with large number of electrodes.

It is a further object of the present invention to provide a novel capacitive tile tactile sensor that can incorporate existing inexpensive ICs adapted to operate a limited number of individual sensors.

The tactile array sensor of the invention consists of at least two groups of individual sensors. Each group is formed by a corresponding number of individual capacitance-sensing electrodes formed on a flexible first electrode layer, this layer being separated by a compressible dielectric layer from a second electrode layer. The second electrode layer is preferably a single electrode covering the entire surface of the tactile sensor array.

Each electrode in a group is connected to a dedicated ASIC preferably located nearby. This IC is adapted to sense capacitance with each of the individual sensors formed between the group of electrodes of the first layer and the single electrode of the second layer. Typically, the number of electrodes controlled in this manner by a single IC is less than 50 and preferably between about 12 and about 24. A combination of individual electrodes, a dedicated capacitance-sensing IC, and a single electrode of the second layer together form a single tactile sensor tile. The orientation of the sensors in a single tile may be in the form of a strip. Parallel configuration of multiple such strips creates a rectangular matrix of sensors in which each column is controlled by a dedicated IC. Another commercially-useful application is a linear arrangement of such strips back to back which creates a long line of sensors with sections that are controlled by their respective ICs. Other configurations may also be devised based on individual needs of a particular tactile sensor array.

With comprehensive tactile sensor arrays having a large number of individual sensors, the number of tiles can be anywhere from two to hundreds or even more. Controlling of and data accumulation from individual ICs is done by other ICs adapted to work not directly with the sensors but rather with their respective controlling ICs.

Dividing the entire plurality of sensors into such groups or tiles allows for substantial reduction of the number of interconnections required for the sensor operation and therefore increases the ease of manufacturing and reliability of operation of the sensor array.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE PREFERRED EMBODIMENTS OF THE INVENTION

A detailed description of the present invention follows with reference to accompanying drawings in which like elements are indicated by like reference letters and numerals.

Figure 3:
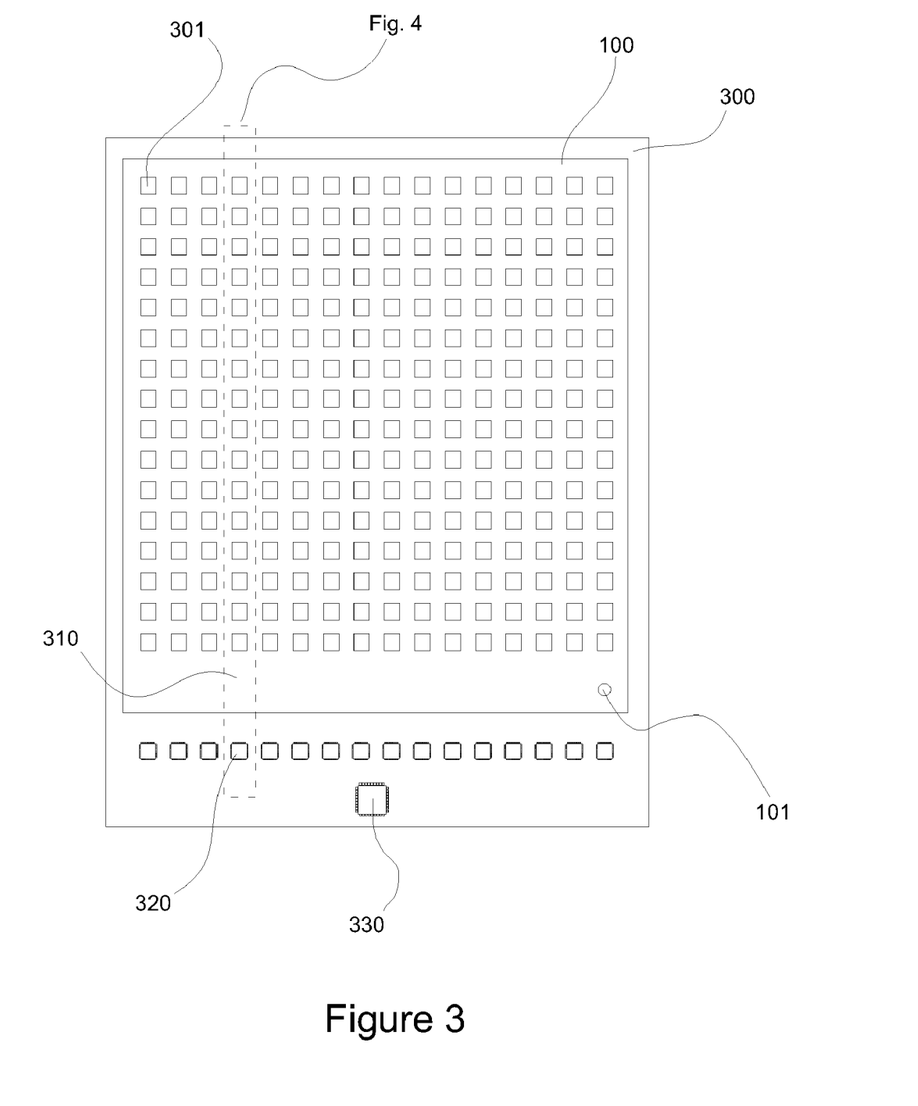
FIG. 3 is a general top view of the tactile array of the invention.

FIG. 3 shows a capacitive tile tactile sensor array according to the invention. It includes a top electrode ground layer 100 separated from the bottom sensing layer 300 by a compressible dielectric layer (not numbered). The top layer can be made from a conductive cloth, flex printed circuit, have a conductive metal surface formed thereon or be formed intermittently by a conductive object coming in contact with the sensor array from time to time.

The bottom sensing layer contains an array of individual electrodes 301, each of these electrodes forming an individual sensor in combination with the top layer and a dielectric layer. These electrodes are divided into groups; in this example each vertical column forms one such group of electrodes, for example a fourth from the right column of electrodes is denoted as a group 310. Such group of electrodes forms an individual strip or tile of electrodes. According to the invention, each such tile or strip is connected to an individual ASIC adapted to operate a limited group of capacitance-sensing electrodes. Small size of such chips makes it convenient to incorporate them right next to the respective group of electrodes, even when they are all located on a flexible substrate. A group of such tiles form together the entire tactile sensor, each tile having a dedicated IC. These ICs are then connected together and are in turn controlled by a host controller IC 330 or alternately they are connected together and adapted to communicate with an external control center. The host controller 330 controls which strip sensor it is collecting data from and the amount of data to be transferred.

The ground layer 100 is connected to the sensing layer 300 by a single connection 101, thus completing the circuit for the individual electrodes to serve as capacitance sensors, as further electrical connections are made in the sensing layer 300 to connect the ground layer to individual capacitance-sensing ICs.

As the number of individual electrodes amenable for control using available off-the-shelf capacitance-sensing ICs is about 12 to 24, using such arrangement allows reducing greatly the number of connections between the sensor array and control electronics.

Figure 4:
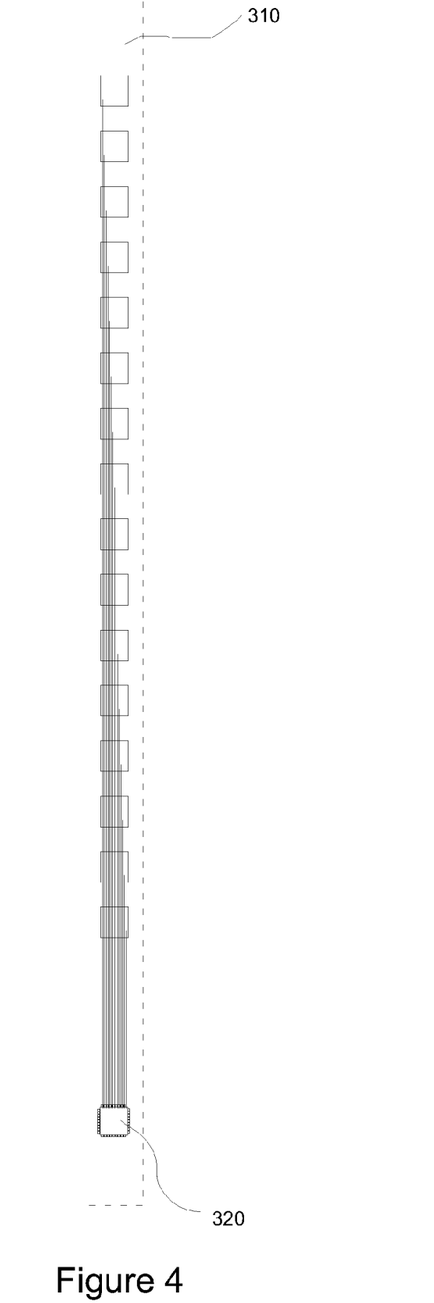
FIG. 4 illustrates electrical connections made on one side of the a single tactile strip module (tile) from FIG. 3 connecting individual capacitor electrodes to their respective control and data accumulator IC.

The capacitance electrodes are formed by having their respective connecting electrodes etched onto the surface of Flex circuit or printer board with conductive ink and by using a conductive cloth electrode as shown in greater detail on FIG. 4. (FIG. 3 does not show these connections).

Figure 5:
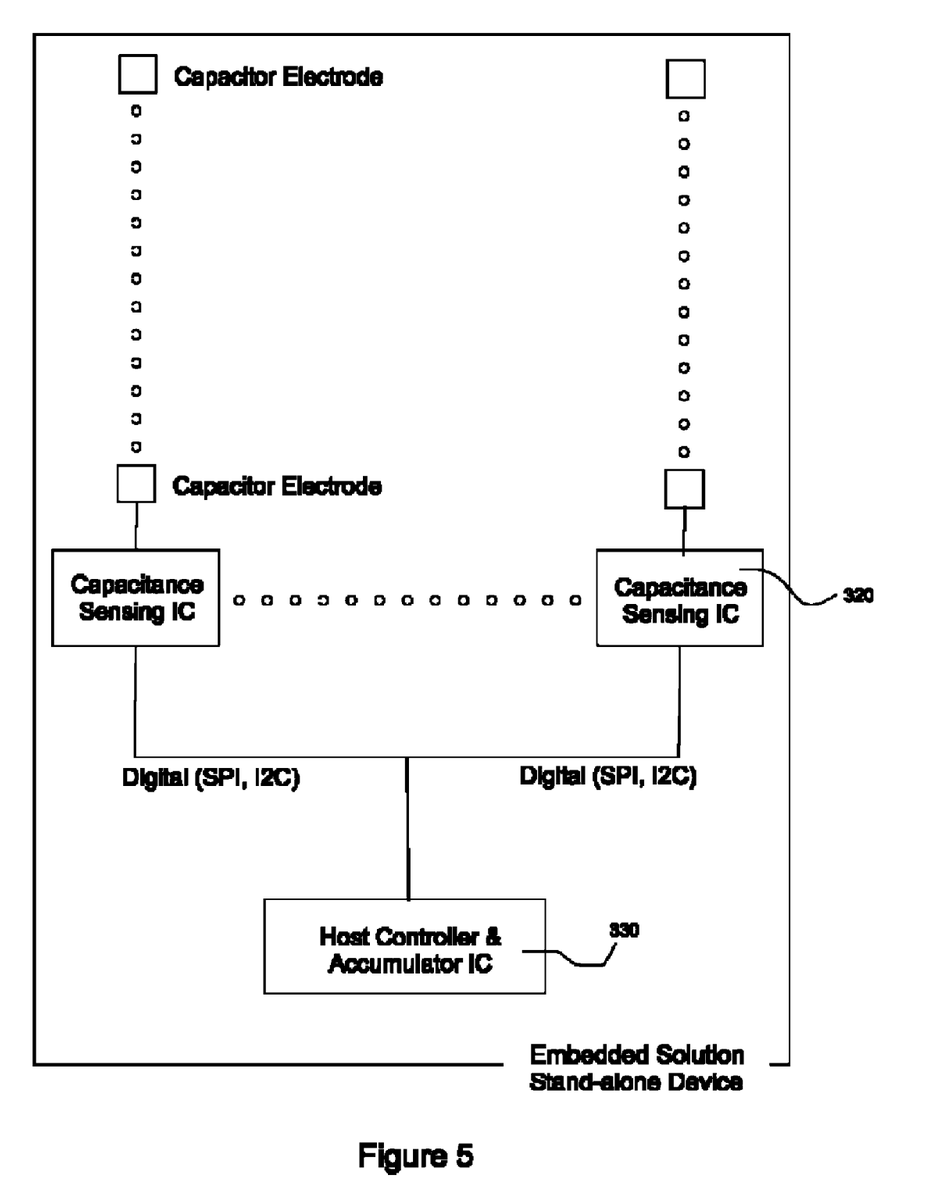
FIG. 5 is an alternative configuration of the tile sensor adapted to serve as a stand-alone self-contained device.

The capacitance-sensing IC 320 connects to each of the individual capacitor electrodes. It contains logic to control and manage data. It stores all the data from the capacitance conversion and it processes command to start a new conversion. FIG. 5 shows how each of the capacitance-sensing IC 320 is connected to a host controller 330, which collects all the data from all capacitance-sensing ICs 320. The communication between the capacitance-sensing IC 320 and the host controller 330 is done digitally using for example I2C or SPI. This arrangement represents an imbedded solution for a self-contained device.

Figure 6:
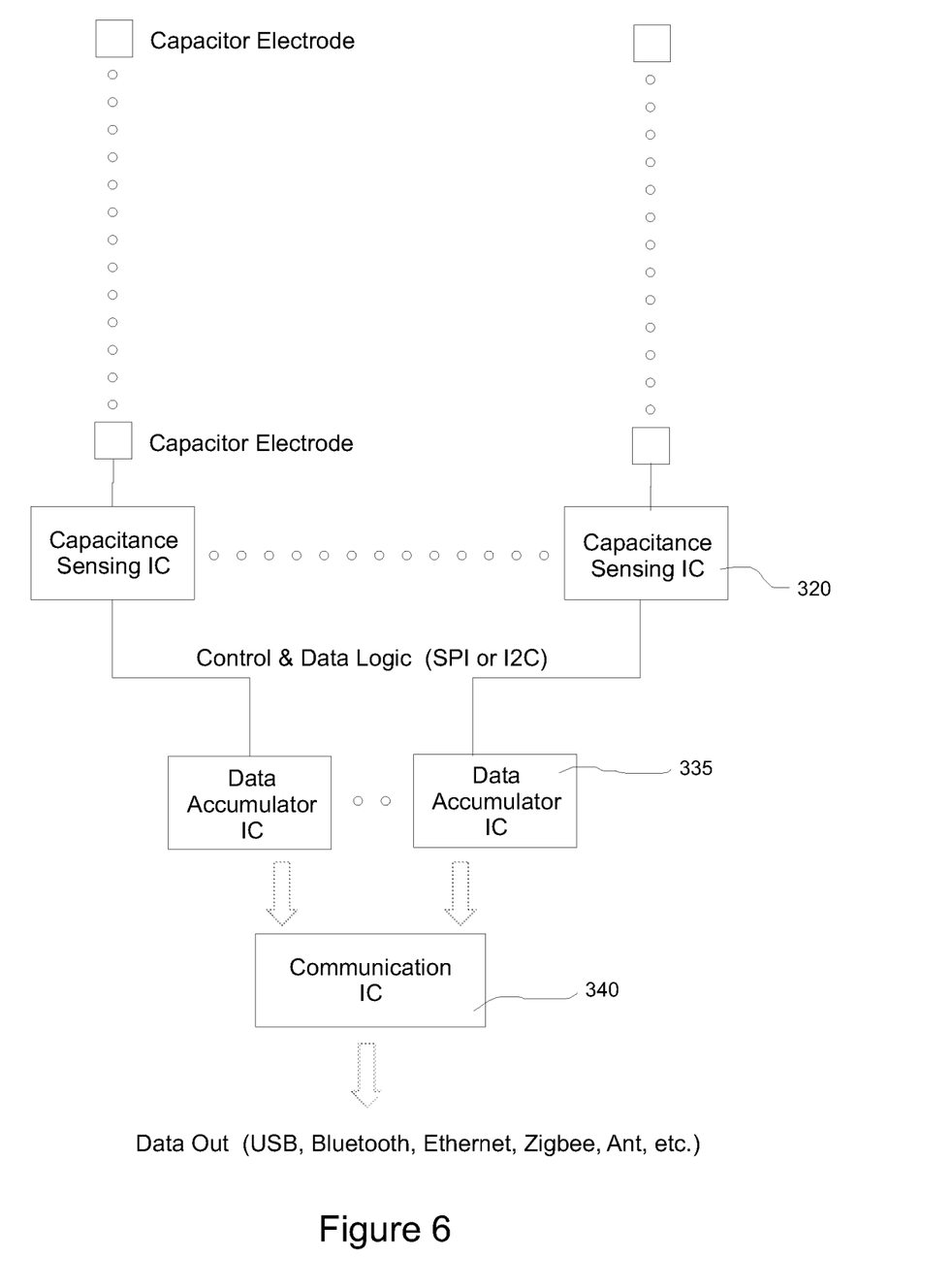
FIG. 6 is yet another alternative configuration of the tile sensor adapted for communicating with an external computerized control center.

FIG. 6 shows a version of the tactile sensor of the invention adapted to communicate with an external controller such as a PC. In this case, capacitance-sensing ICs 320 are connected to respective data accumulator ICs 335, which are then all conncted to a communication IC 340. This communication IC 340 is capable of accumulating and forwarding the useful pressure information through USB, Bluetooth, Ethernet, Zigbee, Ant, etc. to a personal computer or another client of the sensor array.

Figure 7:
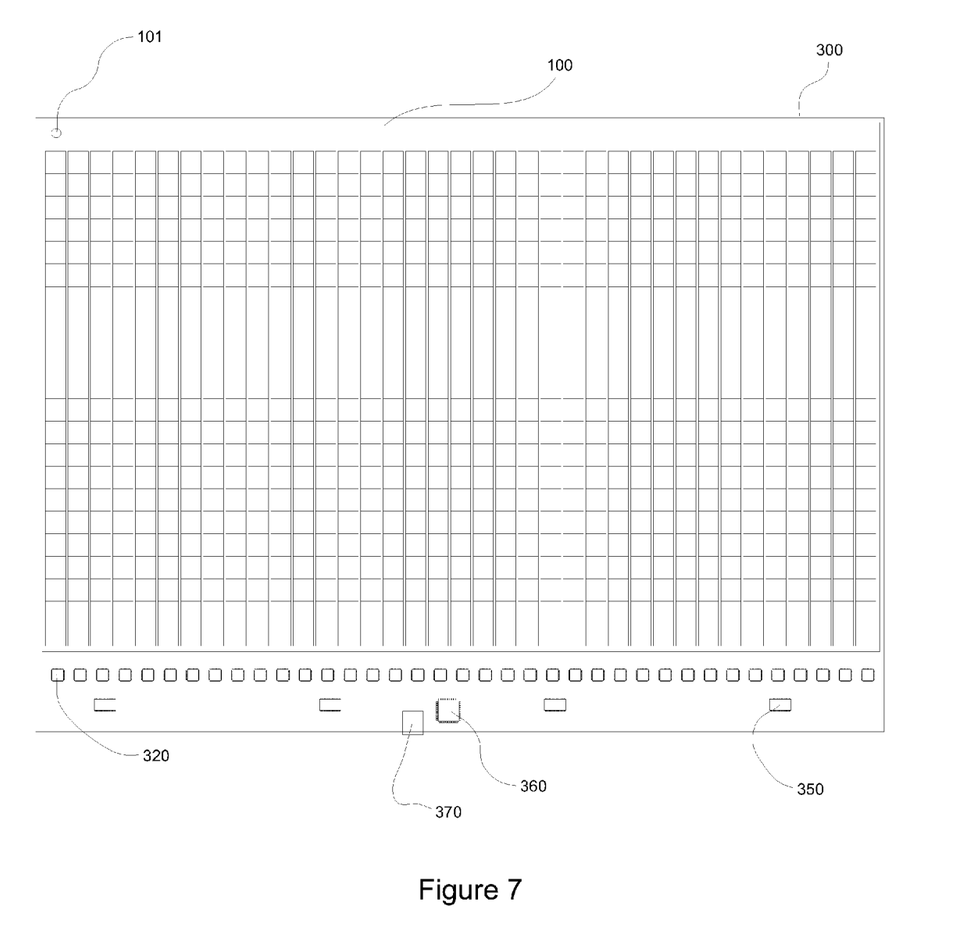
FIG. 7 illustrates yet another version of the tile sensor of the invention in which individual ICs are controlled in groups by a respective multiplexer, the multiplexers are in turn controlled by a single control and data accumulator IC.

FIG. 7 illustrates a commercially useful example of a flexible tactile sensor of the invention. The first single-electrode layer 100 contains an electrode surface covering the entire sensor area. It is supported by a compressible dielectric structure as previously described. On the other side of the dielectric layer there is located a second layer 300 containing a number of columns (in this case 37), each column having the same number of individual electrodes (in this case 22). Each column of electrodes forms a column of capacitance sensors in combination with the ground electrode 100 and the compressibe dielectric layer. Together these columns form an orthogonal 37×22 matrix of sensors. The ground electrode is electrically connected to the second layer 300 via a rivet or a jumper wire 101. From the point of this connection, the electrical signal is routed on the second electrode layer to the appropriate ICs along with corresponding connections of each electrode in a column to its respective IC. These connections are similar to that shown on FIG. 4 and are not shown on this figure. Individual capacitance-sensing ICs 320 are adapted to control and obtain data from their respective electrodes in their column.

A manageable number of such columns of electrodes (preferably between two and 20) are in turn combined in a group having a dedicated multiplexer IC 350 adapted to control each of a number of capacitance-sensing ICs 320. The multiplexer ICs 350 are programmed to sample each column one at a time and then move to the next column. As a result, each multiplexer IC 350 is capable of providing the information about the pressure distribution over the area defined by the number of columns that it controls and the number of electrodes in each column. From that point, the pressure data from each multiplexer IC 350 is routed to the central control and data accumulator IC 360 and then transmitted to the outside electronic control means via an appropriate outer connection means 370 such as for example a USB connector.

Figure 8:
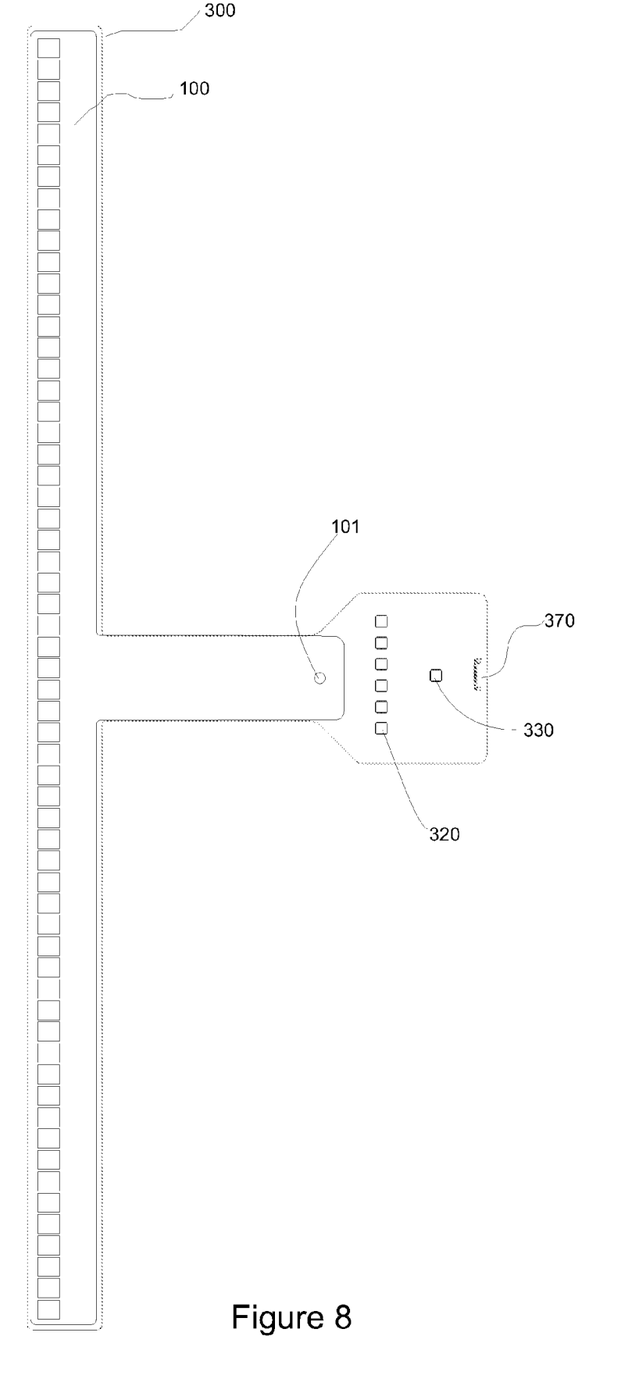
FIG. 8 shows a further variation of the tile sensor of the invention adapted to work as a pressure strip sensor with a linear arrangement of individual sensors.

FIG. 8 shows another practical example of the present invention in which the groups of electrodes are arranged back-to-back along a single line. This arrangement allows for a long strip of pressure sensors in which groups of sensors are controlled by dedicated capacitanse-sensing ICs 320, which in turn communicate the information and receive instructions from the control and data accumulator IC 330. The data is further transmitted outside the sensor via the outer connection means 370 such as a cable connector in this case.

The plurality of conductive electrodes with dielectric support structure are formed on the electrode layer 300 of a Pressure Strip Sensor. It is formed for example by having electrodes etched onto the surface of Flex circuit or a film with conductive ink. The ground electrode 100 is created by using a conductive cloth electrode or a Flex circuit board. An electrical connection 101 between the conductive cloth electrode and the etched electrode is provided to form a Presure Strip Sensor.

Figure 9:
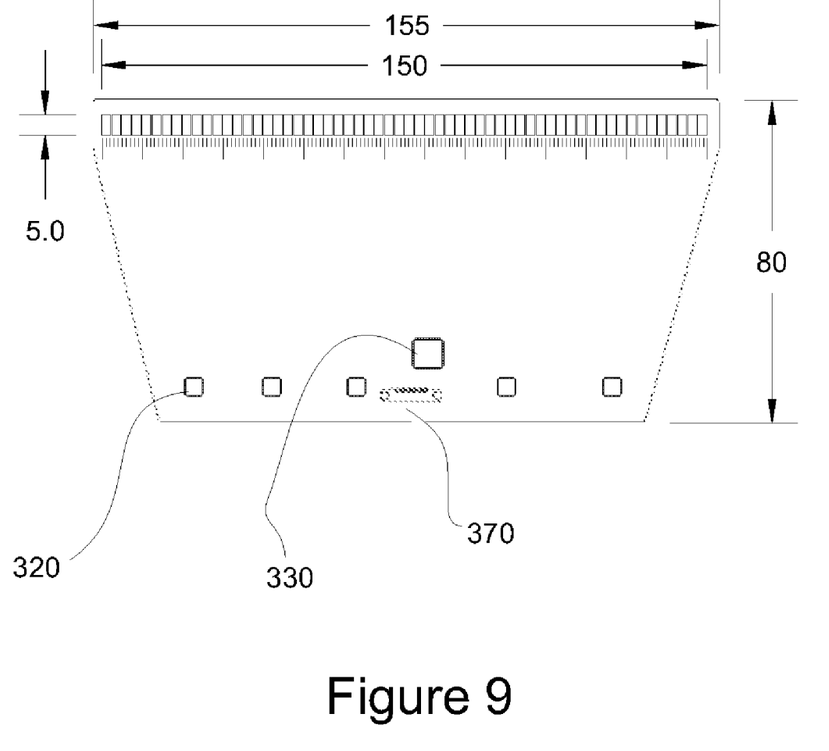
FIG. 9 shows a practical example of the arrangement shown on FIG. 8.

Another example of a pressure strip sensor is shown on FIG. 9. It shows practical dimensions of such device and location of individual ICs.

Figure 10:
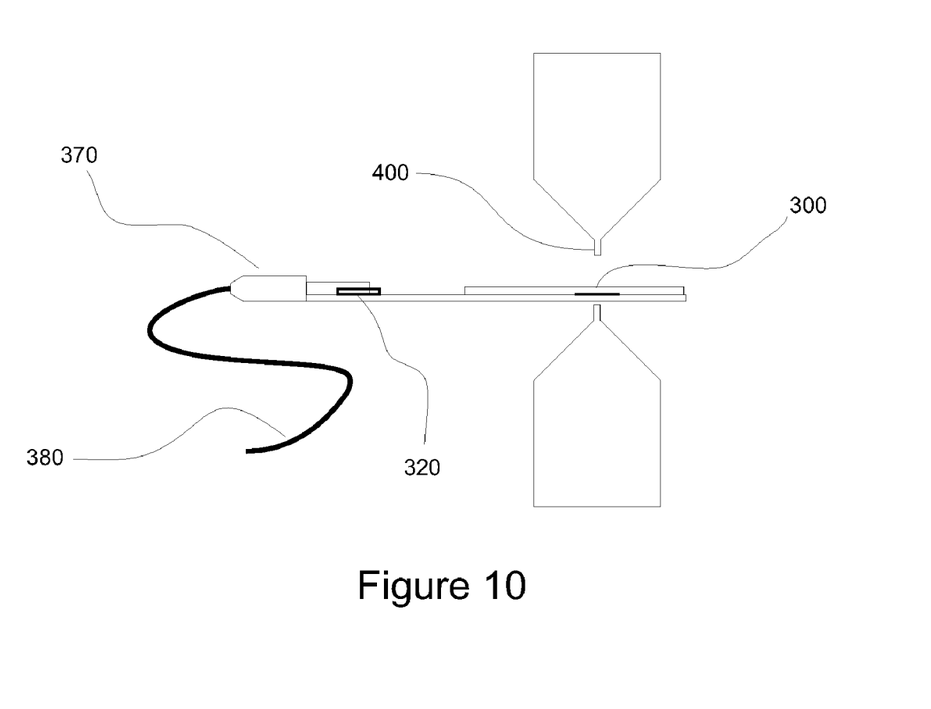
FIG. 10 shows a hot pressure strip configuration in which the single ground electrode comes in contact with the rest of the array only intermittently during the hot compression step of the operation.

A further aspect of the present invention is illustrated on FIG. 10. It takes advantage of the fact that in some applications, the single-electrode layer 100 has to come in contact with the rest of the sensor elements only during the times when pressure information is needed to be collected. One example of such application is thermal sealing operations which require pressure monitoring of the thermal head over the melting material. In a more specific application, such as heat-sealing of Anisotropic Conductive Film, a thermal head in a form of a metal blade is used to apply both pressure and hot temperature to the ACF for making electrical connections. The metal blade is used here as the ground electrode. Since the contact area is limited to a narrow blade, a solid sheet of rubber can be used as a dielectric material to provide the mechanical spring deformation with pressure.

FIG. 10 shows the side view of this arrangement in which the sensing elements layer 300 is located under the metal blade of the thermal head 400 which comes in contact with it only during the activation of the head 400. Upon lowering of the head 400, the sensor is fully formed. When the head 400 is raised again, the sensor is disassembled until the next sealing cycle. Control electronics including the capacitance-sensing ICs 320, the outer connection means 370 and the corresponding data cable 380 communicating pressure data to the control unit for the thermal head 400 are located outside of the area of the thermal head 400. the closed-loop control system is adapted to monitor the pressure on the thermal head 400 and adjust its vertical position to maintain this pressure within preselected limits.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A flexible capacitive tactile sensor comprising:
   a flexible first electrode layer including a single ground electrode covering entire area of said sensor,
   a flexible second electrode layer including at least a first group of electrodes connected individually to a first capacitance-sensing integrated circuit, and a second group of electrodes connected individually to a second capacitance-sensing integrated circuit, and
   a flexible compressible dielectric layer separating said first and said second electrode layers, wherein said ground electrode of said first electrode layer is electrically connected to said first and said second integrated circuits, whereby said first group of electrodes together with said ground electrode and said dielectric layer forming a first group of capacitance sensors, said second group of electrodes together with said ground electrode and said dielectric layer forming a second group of capacitance sensors, said first and second groups of capacitance sensors together forming said tactile sensor, said first and second integrated circuits configured to operate said respective first and second groups of capacitance sensors and collect pressure data therefrom.

2. The tactile sensor as in claim 1, wherein the number of electrodes in each group of electrodes is below fifty.

3. The tactile sensor as in claim 2, wherein the number of electrodes in each group of electrodes is between twelve and twenty four.

4. The tactile sensor as in claim 1 further comprising a control means to operate said first and second integrated circuits and collect pressure data therefrom.

5. The tactile sensor as in claim 1, wherein the number of electrodes in said first group of electrodes is the same as in said second group of electrodes, said electrodes arranged linearly in each respective group of electrodes, said groups located in parallel with one another, whereby said tactile sensor is a matrix with a number of columns defined by a number of groups of electrodes and a number of lines defined by a number of electrodes in each group of electrodes.

6. The tactile sensor as in claim 1, wherein said electrodes are arranged linearly in each group, said groups are located along a single line so that said tactile sensor is formed as a strip sensor.

7. The tactile sensor as in claim 1, wherein said ground electrode comes in contact with said dielectric and second electrode layers only intermittently, said tactile sensor is operational only during the time when all three layers are in contact with each other.

8. The tactile sensor as in claim 1 further including an integrated circuit for control and data accumulation mounted on said sensor and connected to said first and said second capacitance-sensing integrated circuits and an outer connection means to transmit pressure data outside of said sensor.

9. The tactile sensor as in claim 1 further including at least a first and a second integrated circuit for data accumulation connected respectively to the first and second capacitance-sensing integrated circuits, an integrated circuit for collecting said pressure data from said integrated circuits for data accumulation, said circuit also adapted for communicating said pressure data outside said tactile sensor.

10. The tactile sensor as in claim 1 further including at least one multiplexer integrated circuit adapted to control at least two of said capacitance-sensing integrated circuits.

11. The tactile sensor as in claim 1, wherein said first electrode layer is made from a conductive cloth.

12. A method of collecting pressure data from a flexible capacitive tactile sensor including the following steps:
   (a) providing a tactile sensor comprising at least a first group of individual capacitance sensors and a second group of individual capacitance sensors;
   (b) providing a first capacitance-sensing integrated circuit adapted to operate and collect pressure data from said first group of individual capacitance sensors;
   (c) providing a second capacitance-sensing integrated circuit adapted to operate and collect pressure data from said second group of individual capacitance sensors; and
   (d) operating said first and second integrated circuits to collect pressure data from said sensor.

13. The method as in claim 12, wherein said step (d) is accomplished by providing a control means including an integrated circuit for control and data accumulation, said circuit is connected to said first and second capacitance-sensing integrated circuits.

14. The method as in claim 12, wherein said step (d) includes a step of multiplexing in which pressure data is collected from individual capacitance sensors one at a time.

15. The method as in claim 12, wherein communication to said first and second integrated circuits in step (d) is done digitally using I2C or SPI formats.

16. The method as in claim 12, wherein communication to said first and second integrated circuits in step (d) is done via an outer connection means using a communication format selected from a group consisting of universal serial bus (USB), Bluetooth radio communication, Ethernet cable for local area network of computers, Zigbee radio communication, and ANT wireless communication formats.

* * * * *